United States Patent
Koyama

(10) Patent No.: US 7,667,754 B2
(45) Date of Patent: Feb. 23, 2010

(54) AMPLIFYING SOLID-STATE IMAGING DEVICE

(75) Inventor: Eiji Koyama, Kyoto (JP)

(73) Assignee: Sharp Kabushiki Kaisha, Osaka-Shi (JP)

(*) Notice: Subject to any disclaimer, the term of this patent is extended or adjusted under 35 U.S.C. 154(b) by 820 days.

(21) Appl. No.: 11/090,473

(22) Filed: Mar. 24, 2005

(65) Prior Publication Data
US 2005/0212937 A1   Sep. 29, 2005

(30) Foreign Application Priority Data
Mar. 26, 2004   (JP) .......................... P2004-091544

(51) Int. Cl.
H04N 3/14    (2006.01)
H04N 5/335   (2006.01)

(52) U.S. Cl. .................. 348/308; 348/302; 348/294

(58) Field of Classification Search .............. 348/297, 348/308; 257/292
See application file for complete search history.

(56) References Cited

U.S. PATENT DOCUMENTS

| | | | | |
|---|---|---|---|---|
| 4,659,928 | A * | 4/1987 | Tew | 250/332 |
| 5,955,753 | A * | 9/1999 | Takahashi | 257/292 |
| 6,512,544 | B1 | 1/2003 | Merrill et al. | |
| 6,538,591 | B2 * | 3/2003 | Sato et al. | 341/155 |
| 6,552,746 | B1 | 4/2003 | Yang et al. | |
| 6,947,088 | B2 * | 9/2005 | Kochi | 348/308 |
| 7,218,347 | B2 * | 5/2007 | Shinohara | 348/272 |
| 7,429,764 | B2 * | 9/2008 | Koizumi et al. | 257/292 |
| 7,443,437 | B2 * | 10/2008 | Altice et al. | 348/296 |
| 2002/0050940 | A1 | 5/2002 | Sato et al. | |
| 2003/0189656 | A1 * | 10/2003 | Shinohara | 348/272 |
| 2005/0110885 | A1 * | 5/2005 | Altice et al. | 348/308 |
| 2005/0128327 | A1 * | 6/2005 | Bencuya et al. | 348/308 |
| 2005/0212937 | A1 * | 9/2005 | Koyama | 348/301 |

FOREIGN PATENT DOCUMENTS

| | | |
|---|---|---|
| EP | 1 538 828 A2 | 6/2005 |
| JP | 63-294182 | 11/1988 |
| JP | 05-207376 | 8/1993 |
| JP | 9-46596 | 2/1997 |
| JP | 2002-199292 A | 7/2002 |
| JP | 2004-104676 | 4/2004 |

* cited by examiner

Primary Examiner—Tuan Ho
Assistant Examiner—Christopher K Peterson
(74) Attorney, Agent, or Firm—Edwards Angell Palmer & Dodge LLP; David G. Conlin; David A. Tucker

(57) ABSTRACT

An input side of a switched capacitor amplifier section is connected to output sides of transfer transistors of a photoelectric conversion transfer section group comprised of a prescribed number of a plurality of photoelectric conversion transfer sections, each of which has a photodiode and a transfer transistor. An output side of the switched capacitor amplifier section is connected to a vertical signal line. The switched capacitor amplifier section has a signal charge storage section, an amplification transistor whose an input side is connected to the signal charge storage section, a capacitor connected between input and output sides of the amplification transistor and a reset transistor. A voltage at the ground terminal of an inverting amplifier, which is constructed of a constant current load transistor connected to the output side of the amplification transistor via the vertical signal line and the amplification transistor, is controlled by a vertical scanning circuit.

6 Claims, 14 Drawing Sheets

AMPLIFYING SOLID-STATE IMAGING DEVICE

This nonprovisional application claims priority under 35 U.S.C. §119(a) on Patent Application No. 2004-091544 filed in Japan on Mar. 26, 2004, the entire contents of which are hereby incorporated by reference.

BACKGROUND OF THE INVENTION

The present invention relates to amplifying solid-state imaging devices and to a technique for achieving a low-noise amplifying solid-state imaging device with small-sized pixels.

Conventionally, an amplifying solid-state imaging device, which has a pixel section provided with an amplification function and a scanning circuit provided at the periphery of the pixel section and reads image data by means of the scanning circuit, has been proposed as an amplifying solid-state imaging device. In particular, an APS (Active Pixel Sensor) type image sensor having a CMOS (Complementary Metal Oxide Semiconductor) structure advantageous in integrating the pixel construction with a peripheral driving circuit and a signal processing circuit is known.

The APS type image sensor is normally required to form a photoelectric conversion section, an amplification section, a pixel selection section and a reset section in one pixel. Therefore, three to four MOS transistors are employed besides the photoelectric conversion section normally constructed of a photodiode in the APS type image sensor.

However, if three to four MOS transistors are necessary per pixel, then the arrangement becomes a limitation on reducing the pixel size, and therefore, a method for reducing the transistor count per pixel is proposed (refer to, for example, JP 09-46596 A).

FIG. 14 shows a circuit diagram of the essential part of the amplifying solid-state imaging device in which the transistor count per pixel is reduced. The amplifying solid-state imaging device is constructed of a photodiode 101, a transfer transistor 102 for transferring a signal charge accumulated in the photodiode 101, a reset transistor 131, an amplification transistor 132 and a pixel select transistor 133. In this case, it is known that it is possible to have an extremely low noise and obtain a high-quality image if the photodiode 101 is of the buried type and the signal charge transfer from the photodiode 101 is complete.

FIG. 15 shows a timing chart of the operation of the amplifying solid-state imaging device shown in FIG. 14.

As shown in FIG. 15, during a period T1, a drive pulse φR(m) applied to the gate of the common reset transistor 131 goes high level to turn on the reset transistor 131, and the voltage level below the gate is raised. Consequently, the charge moves to the drain side of the common reset transistor 131 by a common signal charge storage section 108, and the voltage of the signal charge storage section 108 is reset to a power supply voltage VDD.

During the next period T2, the drive pulse φR(m) applied to the gate of the common reset transistor 131 goes low level to turn off the reset transistor 131. However, a drive pulse φS(m) applied to the gate of the common pixel select transistor 133 goes high level to read a reset level to a signal line 135 via the common amplification transistor 132 since the pixel select transistor 133 is in ON state. At this time, the amplification transistor 132 and a constant current load transistor 134 forms a source follower circuit.

During the next period T3, the drive pulse φS(m) applied to the gate of the common pixel select transistor 133 goes low level to turn off the pixel select transistor 133, and a drive pulse φT(m,1) applied to the gate of the transfer transistor 102 of a m-th row goes high level to enter the ON state to raise the potential at the gate. Consequently, the signal charge accumulated in the photodiode 101 of the (m,1)-th row is transferred to the signal charge storage section 108.

During the next period T4, the drive pulse φT(m,1) applied to the gate of the transfer transistor 102 of the (m,1)-th row goes low level to turn off the transfer transistor 102. However, the voltage during the signal charge transfer is held in the common signal charge storage section 108, and the signal level of the (m,1)-th row is read to the signal line 135 via the common amplification transistor 132 since the drive pulse φS(m) applied to the gate of the common pixel select transistor 133 goes high level and in ON state.

Then, after one horizontal scanning period (1H), the signal charge from the photodiode 101 of the (m+1)-th row is conducted to the common reset transistor 131, the amplification transistor 132 and the pixel select transistor 133 via the transfer transistor 102 of the (m,2)-th row for the pixel of the (m,2)-th row, and operation similar to that in the periods T1 through T4 is to be executed.

The above construction and operation are configured to have 2.5 transistors per pixel in the case of one common section per two pixels or have 1.75 transistors per pixel in the case of one common section per four pixels. That is, in these examples, the transistor count per pixel can be reduced.

However, the conventional amplifying solid-state imaging device causes the following problems in terms of the construction and operation. That is, assuming that the capacitance of the common signal charge storage section 108 is CFD, then a charge voltage conversion rate η for converting a signal charge ΔQsig from the photodiode 101 into a voltage signal ΔVsig is expressed by:

$$\eta = G \cdot \Delta V\text{sig}/\Delta Q\text{sig} = G/CFD$$

where G represents the gain of the source follower circuit constructed of the amplification transistor 132 and the constant current load transistor 134 and normally has a value (0.8 to 0.9) slightly smaller than one. It is necessary to reduce CFD in order to increase η. The capacitance CFD of the signal charge storage section 108 is the sum total of the junction capacitance on the drain side of the transfer transistor 102 connected to the signal charge storage section 108, the gate capacitance of the amplification transistor 132 and the junction capacitance to the substrate. Accordingly, there is a problem that the charge voltage conversion rate η is reduced as number of photodiodes and the transfer transistors connected to the common signal charge storage section increases.

SUMMARY OF THE INVENTION

The present invention is to solve the problem and has an object to provide an amplifying solid-state imaging device capable of obtaining a high-quality image and reducing the pixel size.

In order to achieve the object, the amplifying solid-state imaging device of the present invention comprises a plurality of photoelectric conversion transfer sections which are provided for individual pixels, respectively, and each of which has a photoelectric conversion element and a transfer transistor for transferring signal charge of the photoelectric conversion element, wherein the plurality of photoelectric conversion transfer sections are divided into a plurality of photoelectric conversion transfer section groups each composed of a predetermined number of the photoelectric conversion transfer sections, respectively;

a plurality of switched capacitor amplifier sections each of which is provided for each of the photoelectric conversion transfer section groups and has an input side connected to output terminals of the transfer transistors in each of the photoelectric conversion transfer section groups and an output side connected to a signal line;

a power supply side load connected to the output sides of the switched capacitor amplifier sections via the signal line; and a control section for controlling the transfer transistors and the switched capacitor amplifier sections, wherein each of the switched capacitor amplifier sections comprises a signal charge storage section to which the output sides of the transfer transistors of the photoelectric conversion transfer section group is connected, an amplification transistor that has an input side connected to the signal charge storage section and an output side connected to the signal line, a capacitance element connected between input and output of the amplification transistor and a reset transistor connected between the input and output of the amplification transistor, and wherein the control section controls a potential at a ground terminal of an inverting amplifier comprised of the amplification transistor of the switched capacitor amplifier section and the power supply side load.

According to the above constitution, the control section controls the transfer transistor and the switched capacitor amplifier section so as to read the signal from the photoelectric conversion element via the transfer transistor every photoelectric conversion transfer section by the switched capacitor amplifier section in each of the photoelectric conversion transfer section group. Moreover, the control section makes the potential at the ground terminal of the inverting amplifier constructed of the amplification transistor and the power supply side load go high level when the switched capacitor amplifier section does not execute the signal charge read operation, by which the inverting amplifier is made inoperative, so that the output of the switched capacitor amplifier section is prevented from being selected (the signal is not outputted from the switched capacitor amplifier section to the signal line).

As described above, by providing the amplifier circuit (switched capacitor amplifier section for converting the signal charge into a voltage and amplifying the voltage) common to the plurality of pixels of the photoelectric conversion transfer section group, the transistor count per pixel can be reduced. Moreover, by providing the amplifier circuit of a switched capacitor type, it becomes possible to effectively reduce the capacitance of the signal charge storage section and enhance the charge voltage conversion gain. Therefore, a low-noise high-quality image can be obtained with a simple construction, and the pixel size can be reduced by largely reducing the transistor count per pixel.

Moreover, in one embodiment, the photoelectric conversion element is a buried photodiode.

According to the embodiment, by making the signal charge transfer from the buried type photodiode complete, a reduced-noise high-quality image can be obtained.

In one embodiment, the control section controls the potential at the ground terminal of the inverting amplifier so that the inverting amplifier does not operate in a period during which the switched capacitor amplifier section does not execute signal charge read operation.

According to the embodiment, the inverting amplifier is made inoperative by controlling the potential at the ground terminal of the inverting amplifier by the control section in the period during which the switched capacitor amplifier section does not execute the read of the signal charge, by which the signal is not outputted from the switched capacitor amplifier section to the signal line. Therefore, the select transistor for selecting the read line becomes unnecessary, and the transistor count per pixel can be reduced.

In one embodiment, the switched capacitor amplifier section has a boosting capacitance element that has one terminal connected to the output terminal of each of the transfer transistors of the photoelectric conversion transfer section group, and wherein the control section controls a potential at the other terminal of the boosting capacitance element so that a potential on the output terminal of each of the transfer transistors of the photoelectric conversion transfer section group is deepened when a signal charge is transferred from the photoelectric conversion element to the signal charge storage section of the switched capacitor amplifier section via the transfer transistor.

According to the embodiment, when the charge is transferred from the photoelectric conversion element to the signal charge storage section via the transfer transistor, the control section controls the potential at the other terminal of the boosting capacitance element to deepen the potential of the signal charge storage section on the input side of the inverting amplifier, allowing the transfer of the signal charge to be facilitated. By this operation, particularly when the photoelectric conversion element is the buried type photodiode, it becomes possible to make the charge transfer from the photodiode to the signal charge storage section complete and largely reduce the read noises.

In one embodiment, the control section controls the potential at the ground terminal of the inverting amplifier so that the inverting amplifier does not operate when a signal charge is transferred from the photoelectric conversion element to the signal charge storage section of the switched capacitor amplifier section via the transfer transistor.

According to the embodiment, the control section makes the inverting amplifier inoperative by controlling the potential at the ground terminal of the inverting amplifier in the period during which the charge is transferred from the photoelectric conversion element to the signal charge storage section via the transfer transistor. By this operation, the select transistor for selecting the read line becomes unnecessary, and the transistor count per pixel can be reduced.

In one embodiment, the power supply side load, which constitutes part of the inverting amplifier, is a constant current load transistor or a resistor.

Moreover, the amplifying solid-state imaging device of the present invention comprises a plurality of photoelectric conversion transfer sections which are provided for individual pixels, respectively, and each of which has a photoelectric conversion element and a transfer transistor for transferring signal charge of the photoelectric conversion element, wherein the plurality of photoelectric conversion transfer sections are divided into a plurality of photoelectric conversion transfer section groups each composed of a predetermined number of the photoelectric conversion transfer sections, respectively;

a plurality of switched capacitor amplifier sections each of which is provided for each of the photoelectric conversion transfer section groups and has an input side connected to output terminals of the transfer transistors in each of the photoelectric conversion transfer section groups and an output side connected to a signal line;

a power supply side load connected to the output sides of the switched capacitor amplifier sections via the signal line; and a control section for controlling the transfer transistors and the switched capacitor amplifier sections, wherein each of the switched capacitor amplifier sections comprises a signal charge storage section to which the output sides of the transfer transistors of the photoelectric conversion transfer section group is connected, an amplification transistor that has an input side connected to the signal charge storage section and an output side connected to the signal line, a capacitance element connected between input and output of the amplification transistor and a reset transistor connected between an input portion of the amplification transistor and a potential portion to which a constant voltage is applied, and wherein the control section controls a potential at a ground terminal of an inverting amplifier comprised of the amplification transistor of the switched capacitor amplifier section and the power supply side load.

According to the construction, the control section controls the transfer transistor and the switched capacitor amplifier section so as to read the signal from each of the photoelectric conversion elements via each of the transfer transistor by the switched capacitor amplifier section every photoelectric conversion transfer section in each of the photoelectric conversion transfer section groups. Moreover, the control section makes the potential at the ground terminal of the inverting amplifier section constructed of the amplification transistor and the power supply side load go high level when the switched capacitor amplifier section does not execute the signal charge read operation, by which the inverting amplifier is made inoperative, so that the output of the switched capacitor amplifier section is prevented from being selected (the signal is not outputted from the switched capacitor amplifier section to the signal line). Moreover, by using, for example, a light shielding pattern common to all the pixels for the potential portion to which the constant voltage is applied when the potential of the signal charge storage section is reset by turning on the reset transistor, the potential at the time of resetting the signal charge storage section can be set to the same constant potential for all the pixels, and variations in the reference voltage between the pixels can be reduced.

As described above, by providing an amplifier circuit (switched capacitor amplifier section for converting the signal charge into a voltage and amplifying the voltage) common to the plurality of pixels of the photoelectric conversion transfer section group, the transistor count per pixel can be reduced. Moreover, by providing the amplifier circuit of the switched capacitor type, it becomes possible to effectively reduce the capacitance of the signal charge storage section and enhance the charge voltage conversion gain. Therefore, a low-noise high-quality image can be obtained with a simple construction, and the pixel size can be reduced by largely reducing the transistor count per pixel.

In one embodiment, the photoelectric conversion element is a buried photodiode.

According to the embodiment, by making the signal charge transfer from the buried type photodiode complete, a reduced-noise high-quality image can be obtained.

In one embodiment, the control section controls the potential at the ground terminal of the inverting amplifier so that the inverting amplifier does not operate in a period during which the switched capacitor amplifier section does not execute signal charge read operation.

According to the embodiment, the inverting amplifier is made inoperative by controlling the potential at the ground terminal of the inverting amplifier by the control section in the period during which the switched capacitor amplifier section does not execute the read of the signal charge, by which the signal is not outputted from the switched capacitor amplifier section to the signal line. Therefore, the select transistor for selecting the read line becomes unnecessary, and the transistor count per pixel can be reduced.

In one embodiment, the switched capacitor amplifier section has a boosting capacitance element that has one terminal connected to the output terminal of each of the transfer transistors of the photoelectric conversion transfer section group, and wherein the control section controls a potential at the other terminal of the boosting capacitance element so that a potential on the output terminal of each of the transfer transistors of the photoelectric conversion transfer section group is deepened when a signal charge is transferred from the photoelectric conversion element to the signal charge storage section of the switched capacitor amplifier section via the transfer transistor.

According to the embodiment, when the charge is transferred from the photoelectric conversion element to the signal charge storage section via the transfer transistor, the control section controls the potential at the other terminal of the boosting capacitance element to deepen the potential of the signal charge storage section on the input side of the inverting amplifier, allowing the transfer of the signal charge to be facilitated. By this operation, particularly when the photoelectric conversion element is the buried type photodiode, it becomes possible to make the charge transfer from the photodiode to the signal charge storage section complete and largely reduce the read noises.

In one embodiment, the control section controls the potential at the ground terminal of the inverting amplifier so that the inverting amplifier does not operate when a signal charge is transferred from the photoelectric conversion element to the signal charge storage section of the switched capacitor amplifier section via the transfer transistor.

According to the embodiment, the control section makes the inverting amplifier inoperative by controlling the potential at the ground terminal of the inverting amplifier in the period during which the charge is transferred from the photoelectric conversion element to the signal charge storage section via the transfer transistor. By this operation, the select transistor for selecting the read line becomes unnecessary, and the transistor count per pixel can be reduced.

In one embodiment, the constant voltage applied to the potential portion is outputted from a voltage generation circuit fabricated on the same semiconductor substrate as that of the amplification transistor of the inverting amplifier with a transistor of the same structure as that of the amplification transistor of the inverting amplifier.

According to the embodiment, by outputting the constant voltage from the voltage generation circuit fabricated on the identical semiconductor substrate with a transistor of the same structure as that of the amplification transistor of the inverting amplifier, the constant voltage of the optimum value can consistently be generated without receiving the influences of the process variation, the temperature change, the power supply voltage fluctuation and so on.

In one embodiment, the potential portion to which the constant voltage is applied is a light shielding pattern comprised of a conductive material and common to all pixels.

According to the embodiment, by using the light shielding pattern constructed of the conductive material common to all the pixels as the potential portion to which the constant voltage is applied, the constant voltage can easily be applied to the input portions of the amplification transistors of all the pixels via the reset transistor without separately providing wiring.

In one embodiment, the power supply side load, which constitutes part of the inverting amplifier, is a constant current load transistor or a resistor.

Moreover, the amplifying solid-state imaging device of the present invention comprises a plurality of photoelectric conversion transfer sections which are provided for individual pixels, respectively, and each of which has a photoelectric conversion element and a transfer transistor for transferring signal charge of the photoelectric conversion element, wherein the plurality of photoelectric conversion transfer sections are divided into a plurality of photoelectric conversion transfer section groups each composed of a predetermined number of the photoelectric conversion transfer sections, respectively;

a plurality of switched capacitor amplifier sections each of which is provided for each of the photoelectric conversion transfer section groups and has an input side connected to output terminals of the transfer transistors in each of the photoelectric conversion transfer section groups and an output side connected to a signal line;

a power supply side load connected to the output sides of the switched capacitor amplifier sections via the signal line; and a control section for controlling the transfer transistors and the switched capacitor amplifier sections, wherein each of the switched capacitor amplifier section comprises a signal charge storage section to which the output sides of the transfer transistors of the photoelectric conversion transfer section group is connected, an amplification transistor that has an input side connected to the signal charge storage section, a capacitance element connected between input and output of the amplification transistor and a reset transistor connected between an input portion of the amplification transistor and a potential control line, and wherein the control section controls a potential at an input portion of an inverting amplifier comprised of the amplification transistor of the switched capacitor amplifier section and the power supply side load by controlling a potential at the potential control line while turning on the reset transistor.

According to the above constitution, the control section controls the transfer transistor and the switched capacitor amplifier section so as to read the signal from the photoelectric conversion element via the transfer transistor every photoelectric conversion transfer section by the switched capacitor amplifier section in each of the photoelectric conversion transfer section groups. Moreover, the control section makes the potential at the ground terminal of the inverting amplifier section constructed of the amplification transistor and the power supply side load go high level when the switched capacitor amplifier section does not execute the signal charge read operation, by which the inverting amplifier is made inoperative, so that the output of the switched capacitor amplifier section is prevented from being selected (the signal is not outputted from the switched capacitor amplifier section to the signal line). Moreover, the control section controls the potential of the potential control line when resetting the potential of the signal charge storage section by turning on the reset transistor, by which the potential at the time of resetting the signal charge storage section can be set to the desired value.

As described above, by providing the amplifier circuit (switched capacitor amplifier section for converting the signal charge into a voltage and amplifying the voltage) common to the plurality of pixels of the photoelectric conversion transfer section group, the transistor count per pixel can be reduced. Moreover, by providing the amplifier circuit of the switched capacitor type, it becomes possible to effectively reduce the capacitance of the signal charge storage section and enhance the charge voltage conversion gain. Therefore, a low-noise high-quality image can be obtained with a simple construction, and the pixel size can be reduced by largely reducing the transistor count per pixel.

In one embodiment, the photoelectric conversion element is a buried photodiode.

According to the embodiment, by making the signal charge transfer from the buried type photodiode complete, a reduced-noise high-quality image can be obtained.

In one embodiment, the control section controls the potential at the input portion of the inverting amplifier by controlling the potential of the potential control line so that the inverting amplifier does not operate in a period during which the switched capacitor amplifier section does not execute signal charge read operation.

According to the embodiment, the inverting amplifier is made inoperative by controlling the potential at the ground terminal of the inverting amplifier by the control section in the period during which the switched capacitor amplifier section does not execute the read of the signal charge. By this operation, the select transistor for selecting the read line becomes unnecessary, and the transistor count per pixel can be reduced.

In one embodiment, the switched capacitor amplifier section has a boosting capacitance element that has one terminal connected to the output terminal of each of the transfer transistors of the photoelectric conversion transfer section group, and wherein the control section controls a potential at the other terminal of the boosting capacitance element so that a potential on the output terminal of each of the transfer transistors of the photoelectric conversion transfer section group is deepened when a signal charge is transferred from the photoelectric conversion element to the signal charge storage section of the switched capacitor amplifier section via the transfer transistor.

According to the embodiment, when the charge is transferred from the photoelectric conversion element to the signal charge storage section via the transfer transistor, the control section controls the potential at the other terminal of the boosting capacitance element to deepen the potential of the signal charge storage section on the input side of the inverting amplifier, allowing the transfer of the signal charge to be facilitated. By this operation, particularly when the photoelectric conversion element is the buried type photodiode, it becomes possible to make the charge transfer from the photodiode to the signal charge storage section complete and largely reduce the read noises.

In one embodiment, the other terminal of the boosting capacitance element is connected to the potential control line.

By using the potential control line for controlling the reset potential at the input portion of the amplification transistor via the reset transistor concurrently for the control of the potential at the other terminal of the boosting capacitor, the wiring can be simplified.

In one embodiment, the voltage applied to the potential control line is outputted from a voltage generation circuit fabricated on the same semiconductor substrate as that of the amplification transistor of the inverting amplifier with a transistor of the same structure as that of the amplification transistor of the inverting amplifier.

According to the embodiment, by outputting the voltage to be applied to the potential control line from the voltage generation circuit fabricated on the identical semiconductor substrate with a transistor of the same structure as that of the amplification transistor of the inverting amplifier, the constant potential of the optimum value can consistently be generated without receiving the influences of the process variation, the temperature change, the power supply voltage fluctuation and so on.

In one embodiment, a ground terminal of the inverting amplifier is a light shielding pattern comprised of a conductive material and common to all pixels.

Moreover, by using the light shielding pattern constructed of the conductive material common to all the pixels as the ground terminal of the inverting amplifier, the ground terminals of all the inverting amplifiers can easily be provided without separately providing wiring.

In one embodiment, the power supply side load, which constitutes part of the inverting amplifier, is a constant current load transistor or a resistor.

As is apparent from the above, according to the amplifying solid-state imaging device of the present invention, by using the switched capacitor amplifier section common to a plurality of pixels, the transistor count per pixel can be largely reduced without reducing the charge voltage conversion rate, and this is extremely advantageous in reducing the pixel size.

In particular, by grouping the inverting amplifiers into the driving side (amplification transistors of the switched capacitor amplifier sections) and the power supply side load and controlling the potential at the ground terminal of the inverting amplifier or controlling the voltage at the input terminal of the inverting amplifier, it becomes possible to further reduce the transistor count and largely increase the amplification factor. With this arrangement, a reduction in the pixel size and an increase in the charge voltage conversion gain become further possible.

Furthermore, by providing the photodiode of the buried type, it becomes possible to achieve the operation of improving the signal charge transfer from the photodiode and obtain an extremely low-noise image by the complete charge transfer.

For the above reasons, the amplifying solid-state imaging device of the present invention becomes extremely useful for the formation of a small-sized high-performance image sensor.

BRIEF DESCRIPTION OF THE DRAWINGS

The present invention will become more fully understood from the detailed description given hereinbelow and the accompanying drawings which are given by way of illustration only, and thus are not intended to limit the present invention, and wherein.

DETAILED DESCRIPTION OF THE PREFERRED EMBODIMENTS

Figure 1:
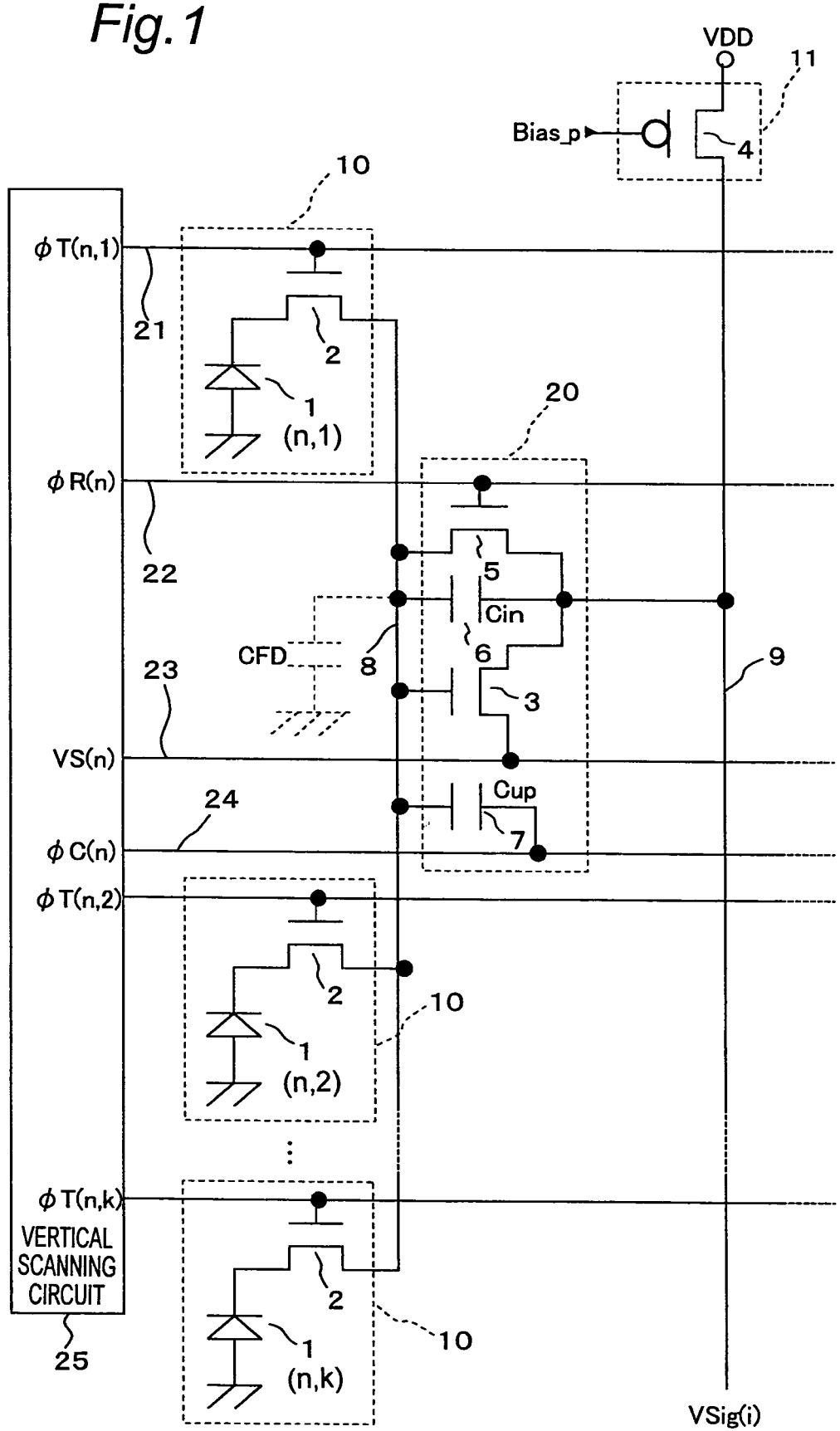
FIG. 1 is a circuit diagram showing the construction of a two-dimensional amplifying solid-state imaging device according to a first embodiment of the present invention.

The amplifying solid-state imaging devices of the present invention will be described in detail below on the basis of the embodiments shown in the drawings.

The First Embodiment

FIG. 1 is a circuit diagram showing the construction of a two-dimensional amplifying solid-state imaging device as one example of an amplifying solid-state imaging device of the first embodiment of the present invention. In the two-dimensional amplifying solid-state imaging device, a plurality of pixels are two-dimensionally arranged in a matrix form.

The figure shows a photoelectric conversion transfer section 10 existing in every pixel, a switched capacitor amplifier section 20 shared by k photoelectric conversion transfer sections 10 in the vertical direction, a power supply side load 11 exemplified by a constant current load transistor 4 shared by all the switched capacitor amplifier sections 20 existing in a column i, and a vertical scanning circuit 25 as one example of a control section. In FIG. 1, only the i-th column of the photoelectric conversion transfer sections 10 of a plurality of rows and a plurality of columns are shown, and the switched capacitor amplifier section 20 is connected to every k photoelectric conversion transfer sections 10 constituting a photoelectric conversion transfer section group in each column. It is to be noted that k and i are integers being not smaller than two.

The photoelectric conversion transfer section, i.e., pixel 10 is constructed of a photodiode 1 as one example of a photoelectric conversion element and a transfer transistor 2.

Moreover, the switched capacitor amplifier section 20 is constructed of a signal charge storage section 8 connected to the output sides of the transfer transistors 2 of the k photoelectric conversion transfer sections 10 of the photoelectric conversion transfer group, an amplification transistor 3 of which the input side is connected to the signal charge storage section 8 and the output side is connected to the vertical signal line 9, a reset transistor 5 inserted between the input and output of the amplification transistor 3, and a capacitor 6 as one example of a capacitance element. The amplification transistor 3 constitutes a constant current load type source-grounded inverting amplifier together with the constant current load transistor 4. One terminal of a boosting capacitor 7 as one example of a boosting capacitance element for raising the voltage of the signal charge storage section 8 common to the k photoelectric conversion transfer sections 10 on the input side of the inverting amplifier is connected to the signal charge storage section 8. In this case, the capacitance of the signal charge storage section 8 is expressed by CFD, the capacitance of the capacitor 6 is expressed by Cin, and the capacitance of the boosting capacitor 7 for raising the voltage is expressed by Cup.

FIG. 1 further shows a transfer transistor drive signal line 21, a reset transistor drive signal line 22, a switched capacitor amplifier ground side signal line 23, and a potential control line 24. The transfer transistor drive signal line 21 is connected to the gate of the transfer transistor 2 of each of the photoelectric conversion transfer sections 10 arranged in the direction of row. The reset transistor drive signal line 22 is connected to the gate of the reset transistor 5 of the switched capacitor amplifier section 20. The switched capacitor amplifier ground side signal line 23 is connected to the source of the amplification transistor 3 of the switched capacitor amplifier section 20 (the ground side terminal of the inverting amplifier). The potential control line 24 is connected to the other terminal of the boosting capacitor 7.

Moreover, in FIG. 1, a pixel in the first row connected to the n-th switched capacitor amplifier section 20 is expressed as (n,1), a pixel in the second row is expressed as (n,2), and a pixel in the k-th row is expressed as (n,k). Therefore, if the two-dimensional solid-state imaging device is constructed of p switched capacitor amplifier sections 20 in the vertical direction, then there are totally k×p pixels in the vertical direction. The p expresses a natural number. Drive pulses φT(n,1), φT(n,2), ..., φT(n,k) are applied to the gates of the transfer transistors 2 of the pixels (n,1), (n,2), (n,k), respectively.

Moreover, in the n-th switched capacitor amplifier section 20, a drive pulse φR(n) is applied to the gate of the reset transistor 5 via the reset transistor drive signal line 22, a control pulse φR(n) for raising the voltage of the signal charge storage section 8 by the capacitance value Cup is applied to the boosting capacitor 7 via the potential control line 24, and VS(n) for controlling the source potential of the amplification transistor 3 is applied via the switched capacitor amplifier ground side signal line 23. It is to be noted that the purpose of the constant current load transistor 4 can be achieved by a high resistance constructed of a diffusion layer or the like even if it is not a transistor. Although the first embodiment is described on the two-dimensional amplifying solid-state imaging device that employs a constant current load type source-grounded inverting amplifier, the purpose can be achieved also by a transistor load type source-grounded inverting amplifier or a cascode type source-grounded inverting amplifier.

Figure 2:
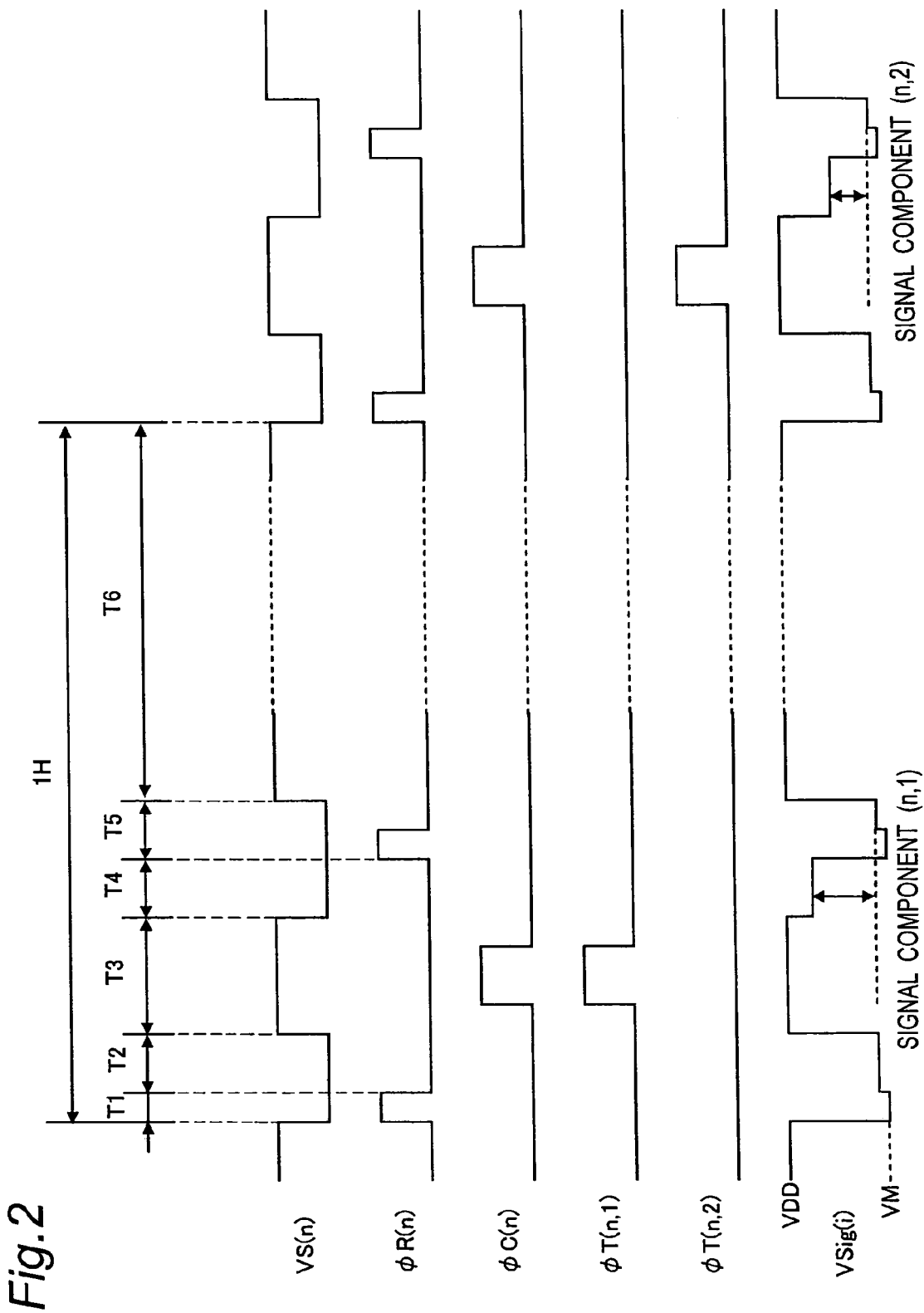
FIG. 2 is a timing chart of drive pulses of the two-dimensional amplifying solid-state imaging device.

FIG. 2 is a timing chart for explaining the operation of the two-dimensional amplifying solid-state imaging device shown in FIG. 1.

During the period T1, the drive pulse φR(n) applied to the gate of the reset transistor 5 of the switched capacitor amplifier section 20 of the n-th row goes high level, and the drive pulse VS(n) applied to the source of the amplification transistor 3 goes low level (ground GND). Then, due to the reset transistor 5 entering ON state, short circuit is achieved between the input and output of the inverting amplifier constructed of the amplification transistor 3 and the constant current load transistor 4, and a potential Vsig(i) of the signal charge storage section 8 and the vertical signal line 9 is reset to a constant potential VM.

Figure 3:
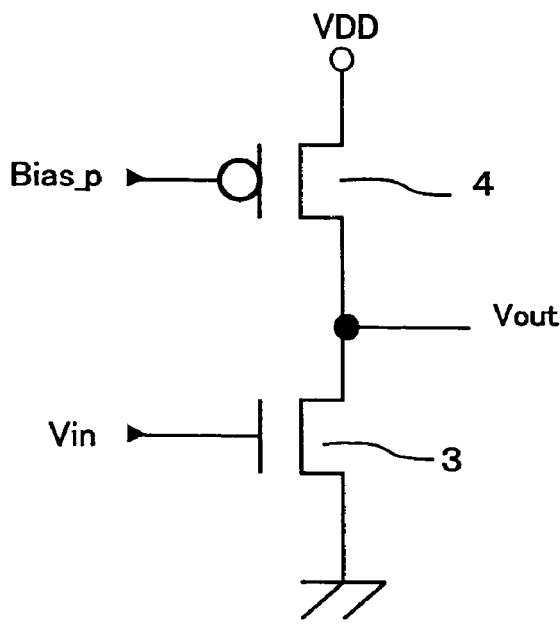
FIG. 3 is a circuit diagram of an inverting amplifier single unit of the two-dimensional amplifying solid-state imaging device.
Figure 4:
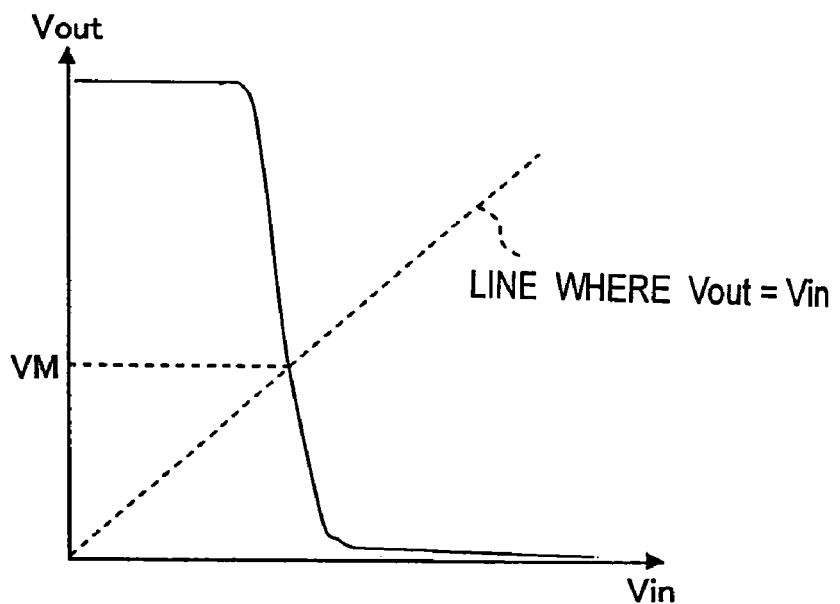
FIG. 4 is a graph of the characteristic of the inverting amplifier of the two-dimensional amplifying solid-state imaging device.

The above is ascribed to the following reasons. FIG. 3 shows a circuit diagram of the inverting amplifier, and FIG. 4 shows its characteristic. Assuming now that short circuit is achieved between the input and output of the inverting amplifier, then an intersecting point of the characteristic curve of the inverting amplifier and a straight line where Vout=Vin becomes the constant potential VM, to which the voltage is reset.

Next, during the period T2 shown in FIG. 2, the drive pulse φR(n) goes low level, and the reset transistor 5 enters OFF state. The voltage of the signal charge storage section 8 is slightly lowered due to the feedthrough of the reset transistor 5 in the OFF stage, and therefore, the potential Vsig(i) of the vertical signal line 9 is raised a little higher than the constant potential VM. The signal voltage obtained at the time serves as the reference voltage of the pixel.

The next period T3 is the period during which the signal charge obtained through photoelectric conversion by the photodiode 1 of the pixel is read to the signal charge storage section 8. First of all, a drive pulse VS(n) applied to the source of the amplification transistor 3 goes high level (power supply voltage VDD), and the amplification transistor 3 enters OFF state. As a result, the potential Vsig of the vertical signal line 9 becomes the power supply voltage VDD. Next, the drive pulse φT(n,1) goes high level, and the signal charge accumulated in the photodiode 1 of the (n,1)-th row is read to the signal charge storage section 8 by the transfer transistors 2 of the (n,1)-th row. Further, by making a control pulse φC(n) go high level at this time, the potential of the signal charge storage section 8 coupled through the capacitance Cup of the boosting capacitor 7 is raised to promote the charge transfer from the photodiode 1 to the signal charge storage section 8, enabling the complete charge transfer to be achieved.

During the next period T4, the drive pulse φT(n,1) and the control pulse φC(n) go low level, and consequently, a voltage shifted by a change due to the signal charge transfer from the voltage in the period T2 is held by the signal charge storage section 8. Further, the drive pulse VS(n) applied to the source of the amplification transistor 3 goes low level (ground GND), by which the held signal level is amplified by the inverting amplifier and outputted to the vertical signal line 9. The vertical signal line potential obtained at the time becomes the signal of the pixel.

During the next period T5, operation similar to that in the periods T1 and T2 is executed to change the drive pulse φR(n) from high level to low level, make the potential of the signal charge storage section 8 and the vertical signal line 9 almost equal to the constant potential VM and reset the potential of the signal charge storage section 8 to the constant potential VM in the initial state.

During the period T6, the drive pulse VS(n) applied to the source of the amplification transistor 3 is raised to high level (power supply voltage VDD). By this operation, the amplification transistor 3 enters OFF state, and the potential of the vertical signal line 9 becomes the power supply voltage VDD again.

If a difference signal between signals on the vertical signal line 9 in the period T2 and the period T4 is taken by a CDS (Correlated Double Sampling) circuit, a differential amplifier circuit or a clamp circuit (these are not especially described in the present specification), then an effective signal due to the charge generated by light incident on the pixel of the (n,1)-th row is read.

Although the description of the operation is for the pixel of the (n,1)-th row, quite similar operation is executed in the pixels of the (n,2)-th to (n,k)-th rows, and only a difference resides in the selection of the drive pulse for turning on the transfer transistor 2 changed from φT(n,1) to φT(n,2) through φT(n,k). FIG. 2 also shows the timing in the case of the pixel of the (n,2)-th row.

In this case, a charge quantity transferred from the photodiode 1 is ΔQsig and the gain of the inverting amplifier (3,4) is A, then the effective signal ΔVsig to be read is expressed by Equation (1):

$$\Delta Vsig = A \cdot \Delta Qsig / [CFD + Cup + (1+A)Cin]$$

where the gain A of the inverting amplifier is expressed by Equation (2):

$$A = gm \cdot \frac{ron \cdot rop}{ron + rop}$$

In Equation (2), gm represents the transconductance of the amplification transistor 3, ron represents the output resistance of the amplification transistor 3, and rop represents the output resistance of the constant current load transistor 4.

Moreover, if the amplifier gain A is very large, then Equation (3):

$$\Delta Vsig \approx \Delta Qsig / Cin$$

holds, and eventually, the charge voltage conversion rate η is expressed by Equation (4):

$$\eta = \Delta Vsig / \Delta Qsig = 1/Cin$$

That is, it is indicated that the output signal does not depend on the capacitance CFD of the signal charge storage section 8. Even if the number of pixels connected in the vertical direction is increased and the capacitance CFD is increased, a reduction in the charge voltage conversion rate η does not occur according to the present invention.

On the other hand, in the period during which the pixel (n,1) through the pixel (n,k) are not selected, the potentials at the terminals of the amplification transistor 3 of the n-th row are expressed as follows.

Source: Power supply voltage VDD
Gate: Constant potential VM (or not higher than the constant potential VM when the signal charge overflowed from the photodiode 1 are accumulated)
Drain: Not lower than the constant potential VM (vertical signal line)

The amplification transistor 3 is constantly put in OFF state.

As a result, although the select transistor for selecting the read line has been needed in the conventional pixel structure, the present invention obviates the need for the select transistor since the amplification transistor 3 can be put in OFF state, i.e., in a state in which the inverting amplifier is inoperative by controlling the source voltage of the amplification transistor 3. With this arrangement, it becomes possible to increase the occupation area of the photodiode 1 in the unit pixel area, and this allows a high-quality image to be obtained and allows the pixel size to be reduced.

During the period T6 in FIG. 2, by raising the source voltage of the amplification transistor 3 to the power supply voltage VDD, the voltage of the signal charge storage section 8 is raised by a voltage VB expressed by the following Equation (5) from the constant potential VM by the capacitive coupling.

$$VB = \{(VDD-VM)Cin + VDD \times Cgs\}/(CFD + Cup + Cin + Cgs)$$

Equation (5)

In the equation, Cgs represents the coupling capacitance between the gate and the source of the amplification transistor 3. In this case, according to circumstances, it is possible that the amplification transistor 3 is not completely turned off during the period T6 depending on the threshold value of the amplification transistor 3.

Figure 5:
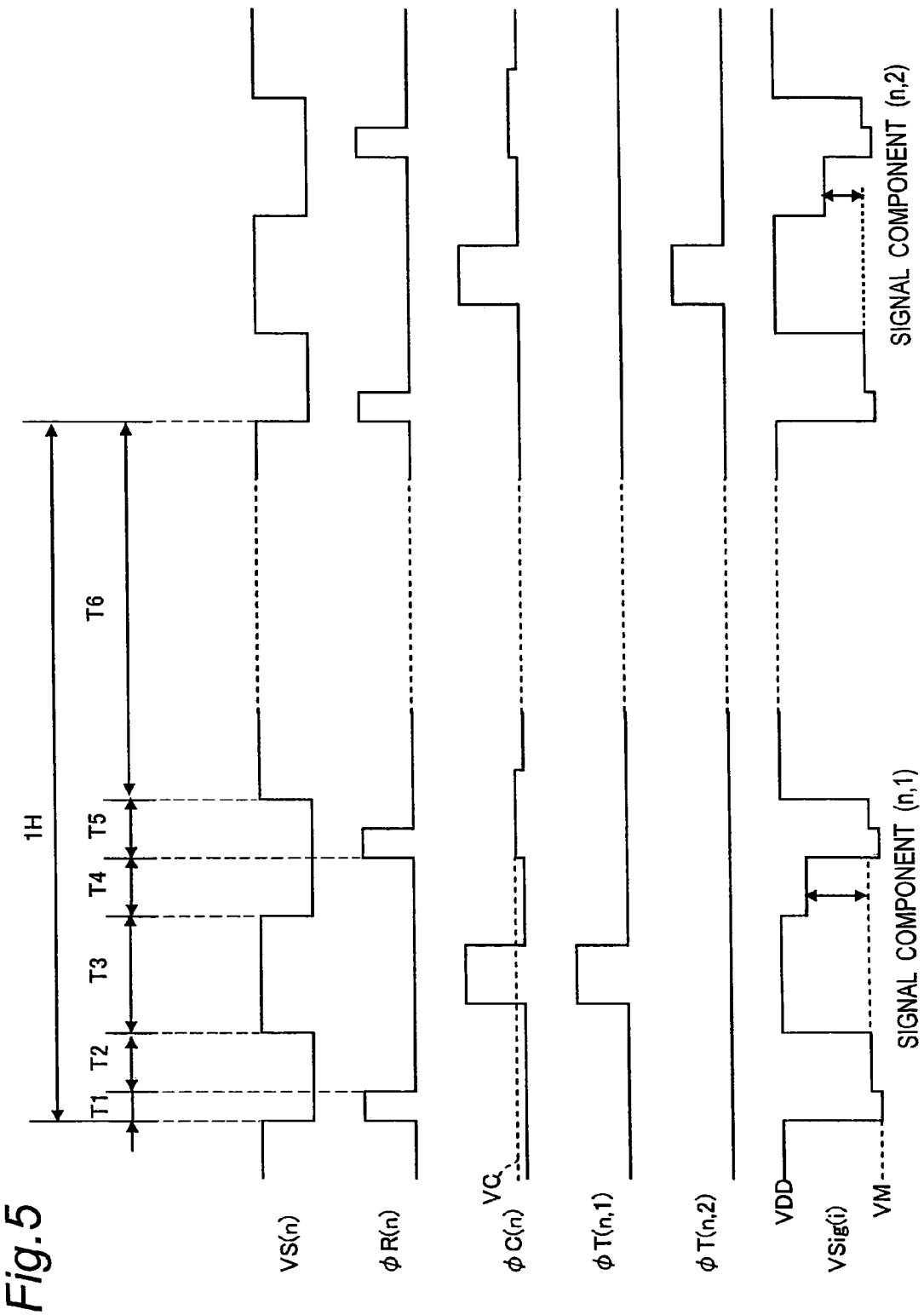
FIG. 5 is a timing chart of other drive pulses of the two-dimensional amplifying solid-state imaging device.

As a driving method for solving the problem, there is a driving method as shown in FIG. 5. FIG. 5 shows a timing chart for explaining the other operation of the circuit shown in FIG. 1, the driving method has the steps of presetting the potential of the control pulse φC(n) in the initial partial periods of the period T5 and the period T6 to a potential VC expressed by the following Equation (6):

$$VC = \{(VDD-VM)Cin + VDD \times Cgs\}/Cup$$

raising the source voltage of the amplification transistor 3 to the power supply voltage VDD during the period T6 and thereafter restoring the potential of the control pulse φC(n) to the ground level GND. By the method, the potential of the signal charge storage section 8 is restored to the constant potential VM, solving the problem described hereinbefore.

According to the two-dimensional amplifying solid-state imaging device of the construction, by providing a common amplifier circuit (switched capacitor amplifier section 20 for converting the signal charge into a voltage and amplifying the voltage) for the plurality of pixels of the photoelectric conversion transfer section group, it becomes possible to reduce the transistor count per pixel. Moreover, by providing the amplifier circuit of the switched capacitor type, it becomes possible to effectively reduce the capacitance of the signal charge storage section 8 and enhance the charge voltage conversion gain. Therefore, a low-noise high-quality image can be obtained with a simple construction, and the pixel size can be reduced by largely reducing the transistor count per pixel.

Moreover, by employing a buried type photodiode for the photoelectric conversion element of the pixel, the signal charge transfer from the photodiode 1 can be made complete, and a noise-reduced high-quality image can be obtained.

Moreover, by making the inverting amplifier inoperative by controlling the voltage at the ground terminal of the inverting amplifier by the vertical scanning circuit 25 in the period during which the switched capacitor amplifier section 20 does not execute the read of the signal charge and in the period during which the charge is transferred from the photodiode 1 to the signal charge storage section 8 via the transfer transistor 2, the transistor for selecting the read line becomes unnecessary, and the transistor count per pixel can be further reduced.

Moreover, when the charge is transferred from the photodiode 1 to the signal charge storage section 8 via the transfer transistor 2, the potential of the signal charge storage section 8 on the input side of the inverting amplifier is deepened by controlling the other terminal voltage of the boosting capacitor 7 by the vertical scanning circuit 25 to facilitate the transfer of the signal charge, so that the charge transfer from the buried type photodiode to the signal charge storage section 8 can be made complete, allowing the read noise to be largely reduced.

The Second Embodiment

Figure 6:
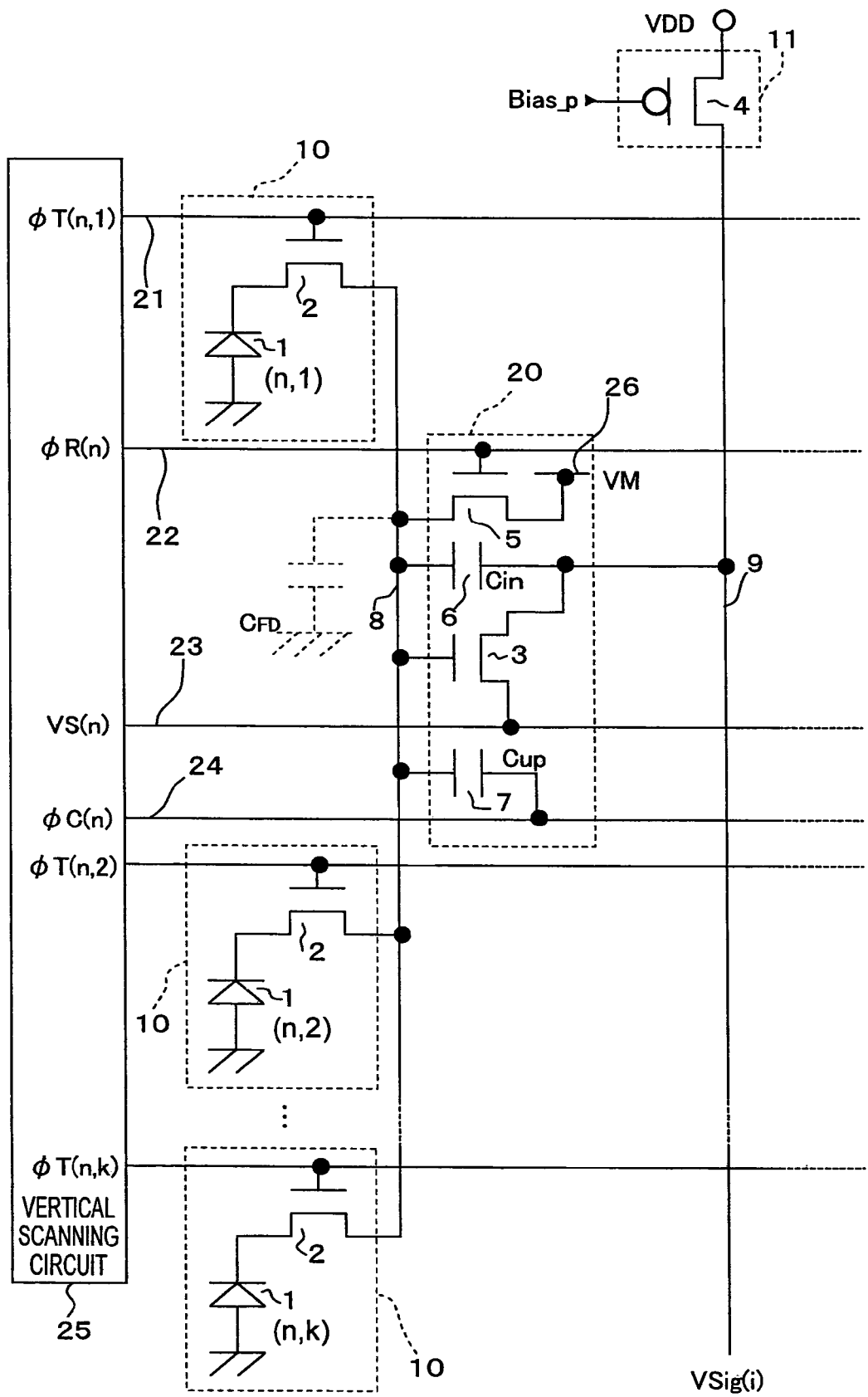
FIG. 6 is a circuit diagram showing the construction of a two-dimensional amplifying solid-state imaging device according to a second embodiment of the present invention.

FIG. 6 is a circuit diagram showing the construction of a two-dimensional amplifying solid-state imaging device as one example of an amplifying solid-state imaging device of the second embodiment of the present invention. The two-dimensional amplifying solid-state imaging device of the second embodiment has the same construction as that of the first embodiment except for the connection of the reset transistor, and the same constituents are denoted by the same reference numerals with no description provided therefor. A difference to the two-dimensional amplifying solid-state imaging device of the first embodiment is as follows. In contrast to the first embodiment in which the reset transistor 5 is inserted between the input and output of the amplification transistor 3, a reset transistor 5 in the second embodiment is inserted between an input portion of an amplification transistor 3 and a light shielding pattern 26 as one example of a potential portion to which a constant potential VM is applied.

Figure 7:
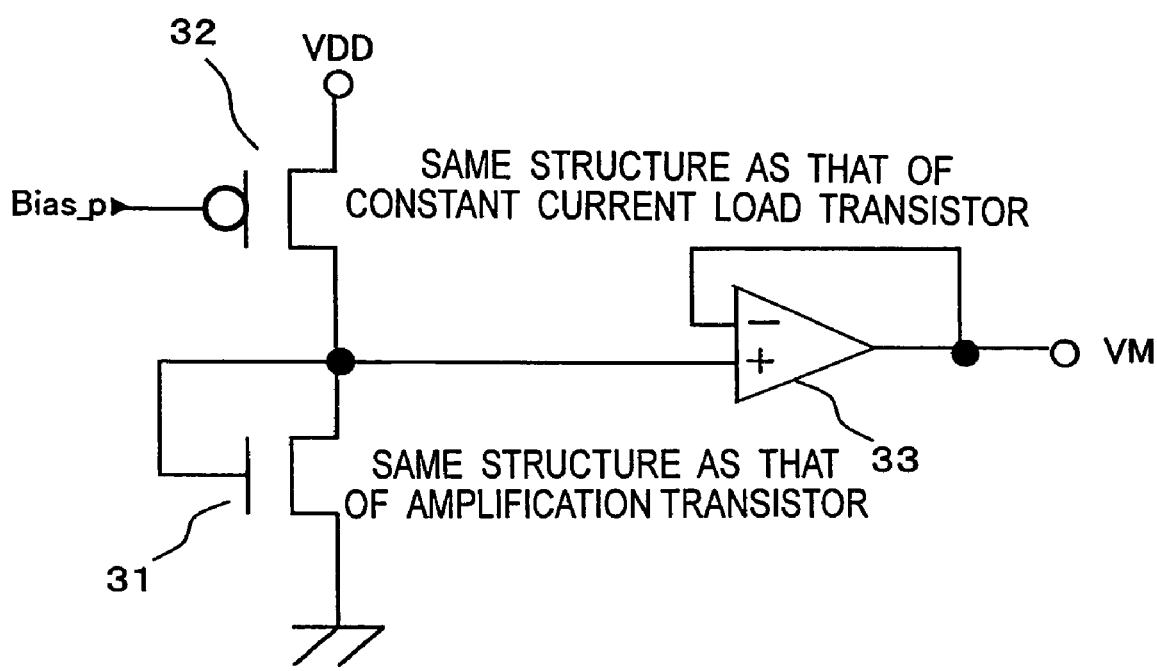
FIG. 7 is a circuit diagram of a VM voltage generation circuit of the two-dimensional amplifying solid-state imaging device.

A voltage generation circuit of the constant potential VM is shown in FIG. 7, where the voltage generation circuit has an NMOS transistor 31 of which a source is connected to the ground and of which a gate and drain are connected together, a PMOS transistor 32 of which a drain is connected to the drain of the NMOS transistor 31 and to which source the power supply voltage VDD is applied, and a buffer 33 whose non-inverted input terminal is connected to the drain of the PMOS transistor 32. The NMOS transistor 31 has the same structure as that of the amplification transistor of the pixel, while the PMOS transistor 32 has the same structure as that of the constant current load transistor.

In the voltage generation circuit, an inverting amplifier is formed on an identical semiconductor substrate by employing transistors of the same structure as those of the inverting amplifier constructed of the amplification transistor 3 and the constant current load transistor 4 of the switched capacitor amplifier section 20 shown in FIG. 6, and a short circuit is formed between the input and output of the inverting amplifier and the output is outputted via the buffer 33 for impedance conversion as a constant potential VM. The output receives no influences of a process variation, a temperature change, a power supply voltage fluctuation and so on because of the use of the transistors of the same structure as those of the inverting amplifier and it is possible to always generate an optimum value and apply the value to the light shielding pattern 26 (light shielding metal) common to all the pixels.

Figure 8:
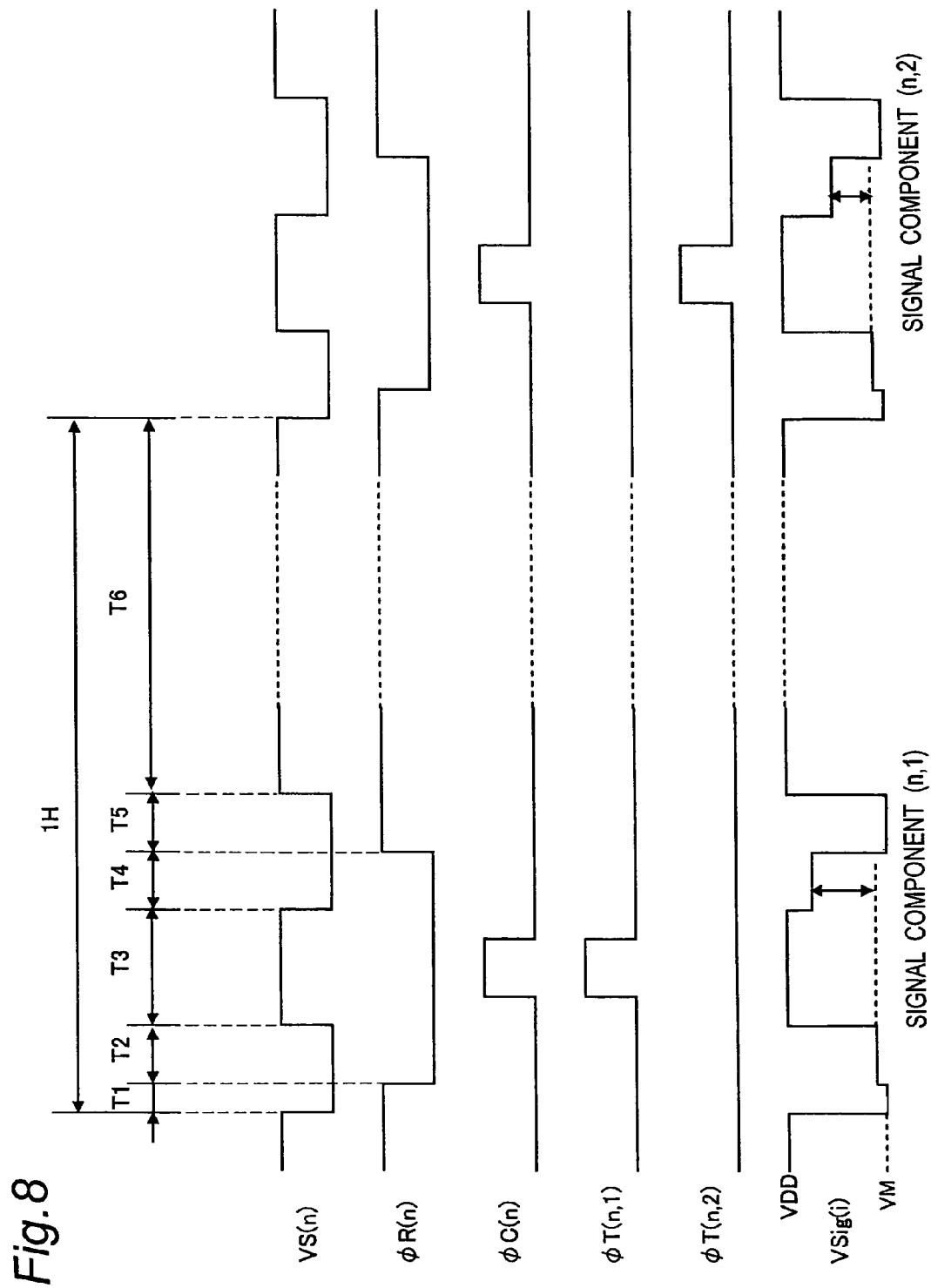
FIG. 8 is a timing chart of drive pulses of the two-dimensional amplifying solid-state imaging device.

FIG. 8 shows the timing chart of the drive pulses of the second embodiment. A difference from the first embodiment resides only in the polarity of the drive pulse φR(n) during the period T6, and the voltage of the signal charge storage section 8 is fixed to the constant potential VM during the period T6 since the drive pulse φR(n) is at high level. Therefore, during the period T6 in which the pixel (n,1) through the pixel (n,k) are not selected, the voltages at the terminals of the amplification transistor 3 of the n-th row are expressed as follows.

Source: Power supply voltage VDD
Gate: Constant potential VM
Drain: Not lower than the constant potential VM (vertical signal line)

The amplification transistor 3 is also consistently put in OFF state.

As a result, the select transistor, which has been needed in the conventional pixel structure, is also unnecessary, and it becomes possible to increase the occupation area of the photodiode 1 in a unit pixel area. This allows a high-quality image to be obtained and allows the pixel size to be reduced. Moreover, the output signal does not depend on the capacitance CFD of the signal charge storage section 8 according to the present invention. Therefore, it is evident that no reduction occurs in the charge voltage conversion rate η also in the second embodiment even if the pixels to be connected in the vertical direction are increased in number and the capacitance CFD is increased.

The two-dimensional amplifying solid-state imaging device of the construction has an effect similar to that of the two-dimensional amplifying solid-state imaging device of the first embodiment.

Moreover, by outputting the constant potential from the voltage generation circuit fabricated on the identical semiconductor substrate with a transistor of the same structure as that of the amplification transistor 3 of the inverting amplifier, the constant potential of the optimum value can consistently be generated without receiving the influences of the process variation, the temperature change, the power supply voltage fluctuation and so on.

Moreover, by using a light shielding pattern constructed of a conductive material common to all the pixels as the potential portion which has the constant potential, the constant potential can easily be given to the input portions of the amplification transistors of all the pixels via the reset transistors without separately providing wiring.

The Third Embodiment

Figure 9:
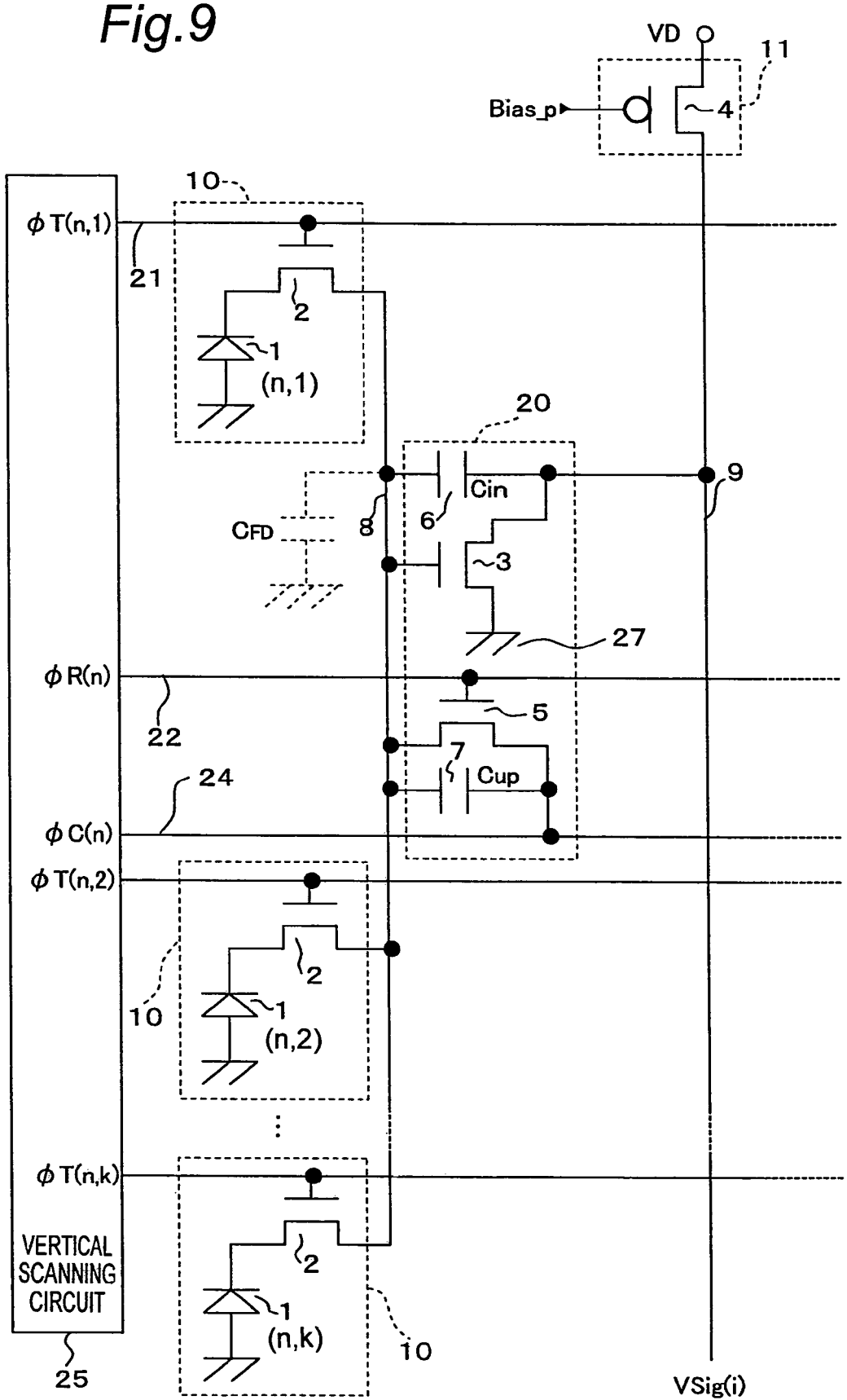
FIG. 9 is a circuit diagram showing the construction of a two-dimensional amplifying solid-state imaging device according to a third embodiment of the present invention.

FIG. 9 is a circuit diagram showing the construction of a two-dimensional amplifying solid-state imaging device as one example of an amplifying solid-state imaging device of the third embodiment of the present invention. The two-dimensional amplifying solid-state imaging device of the third embodiment has the same construction as that of the first embodiment except for the connection of the reset transistor, and the same constituents are denoted by the same reference numerals with no description provided therefor. A difference to the amplifying solid-state imaging device of the first embodiment is as follows. In contrast to the first embodiment in which the reset transistor 5 is inserted between the input and output of the amplification transistor 3, the reset transistor 5 is inserted between the input side of the amplification transistor 3 and a potential control line 24 to which the control pulse φC(n) is applied in the third embodiment. The source of the amplification transistor 3 (the ground terminal of the inverting amplifier) is consistently at the ground level GND, and wiring thereof is provided by utilizing a light shielding pattern 27 (light shielding metal) common to all the pixels or the like.

Figure 10:
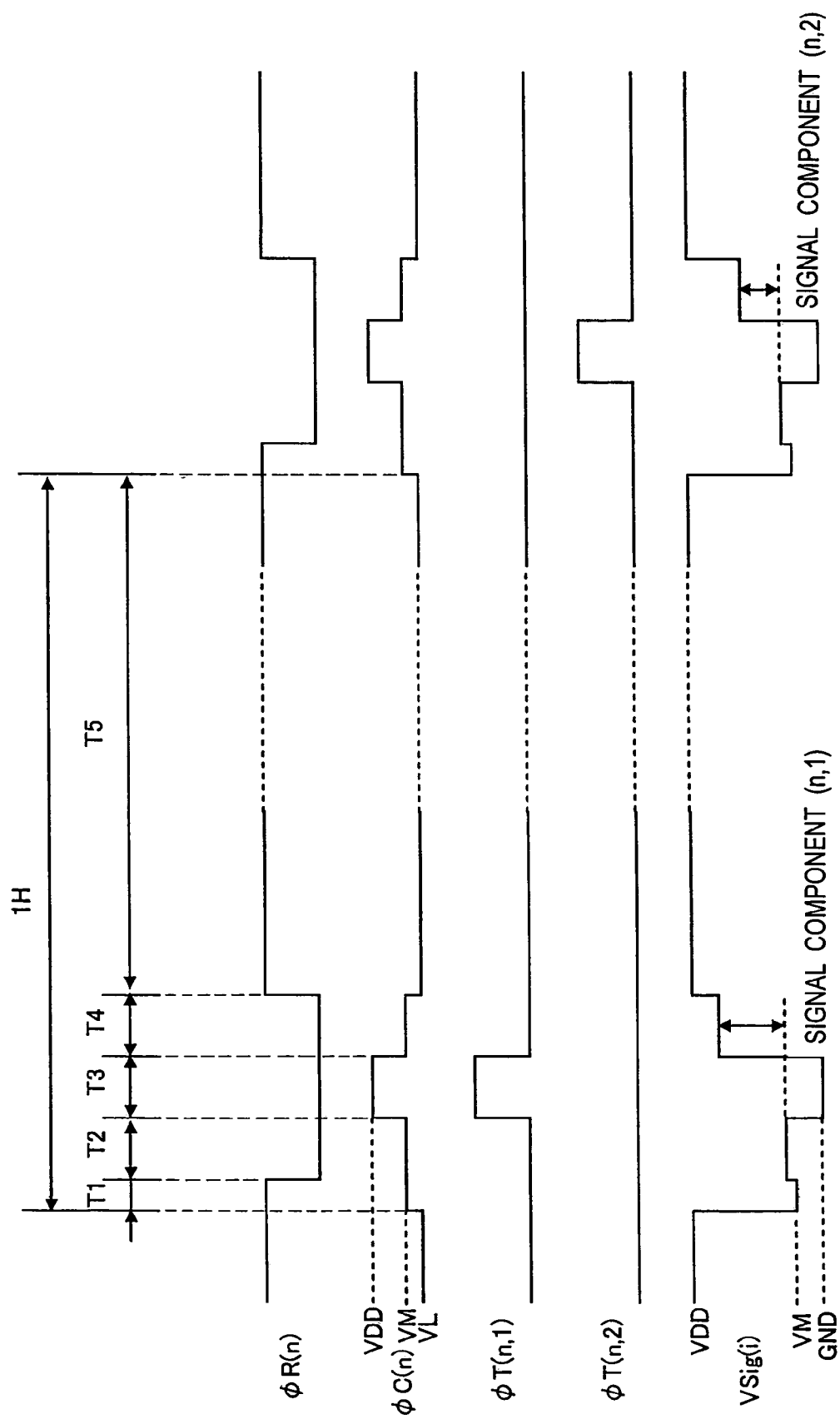
FIG. 10 is a timing chart of drive pulses of the two-dimensional amplifying solid-state imaging device.

FIG. 10 shows the timing chart of the drive pulses of the two-dimensional amplifying solid-state imaging device of the second embodiment.

During the period T1, the drive pulse φR(n) applied to the gate of the reset transistor 5 of the switched capacitor amplifier section 20 of the n-th row goes high level, and the potential of the control pulse φC(n) is the constant potential VM. Therefore, the potential Vsig(i) of the signal charge storage section 8 and the vertical signal line 9 is reset to the constant potential VM.

During the next period T2, the drive pulse φR(n) goes low level, and the reset transistor 5 enters OFF state. The voltage of the signal charge storage section 8 is slightly lowered due to the feedthrough of the reset transistor 5 in the OFF stage, and therefore, the potential Vsig(i) of the vertical signal line 9 is raised a little higher than the constant potential VM. The signal potential obtained at the time serves as the reference potential of the pixel.

The next period T3 is the period during which the signal charge obtained through photoelectric conversion by the photodiode 1 of the pixel 10 is read to the signal charge storage section 8. The transfer transistor 2 enters ON state by making the drive pulse φT(n,1) go high level, and the signal charge accumulated in the pixel photodiodes 1 of the (n,1)-th row is read to the signal charge storage section 8 via the transfer transistor 2 of the (n,1)-th row. Further, by making the control pulse φC(n) go high level at this time, the potential of the signal charge storage section 8 coupled through the capacitance Cup of the boosting capacitor 7 is raised to promote the charge transfer from the photodiode 1 to the signal charge storage section 8, enabling the complete charge transfer to be achieved. The signal charge storage section 8, i.e., input portion of the inverting amplifier is at the power supply voltage VDD level during the period T3, and therefore, the potential of the vertical signal line 9 goes the ground level GND.

During the next period T4, the drive pulse φT(n,1) goes low level to put the transfer transistor 2 in OFF state and restore the control pulse φC(n) to the constant potential VM. Consequently, a potential shifted by a change due to the signal charge transfer from the potential in the period T2 is held by the signal charge storage section 8, and the held signal level is amplified by the inverting amplifier and outputted to the vertical signal line 9. The vertical signal line voltage obtained at the time becomes the signal of the pixel.

During the next period T5, by making the drive pulse φR(n) go high level and making the control pulse φC(n) go the VL level, the potential of the signal charge storage section 8 is reset to the VL level. In this case, the VL level is the maximum gate voltage that does not turn on the path between the drain and the source of the amplification transistor 3. The reason why the voltage of the signal charge storage section 8 is not made to go the ground level GND is that the transfer transistor 2 is normally provided by a depletion type transistor in order to let the signal charge that has undergone photoelectric conversion and overflowed at the photodiode 1 escape. If the gate potential of the amplification transistor 3 (i.e., the potential of the signal charge storage section 8) is at the ground level GND, then the signal charge is disadvantageously injected into the photodiode 1 via the transfer transistor 2.

Figure 11:
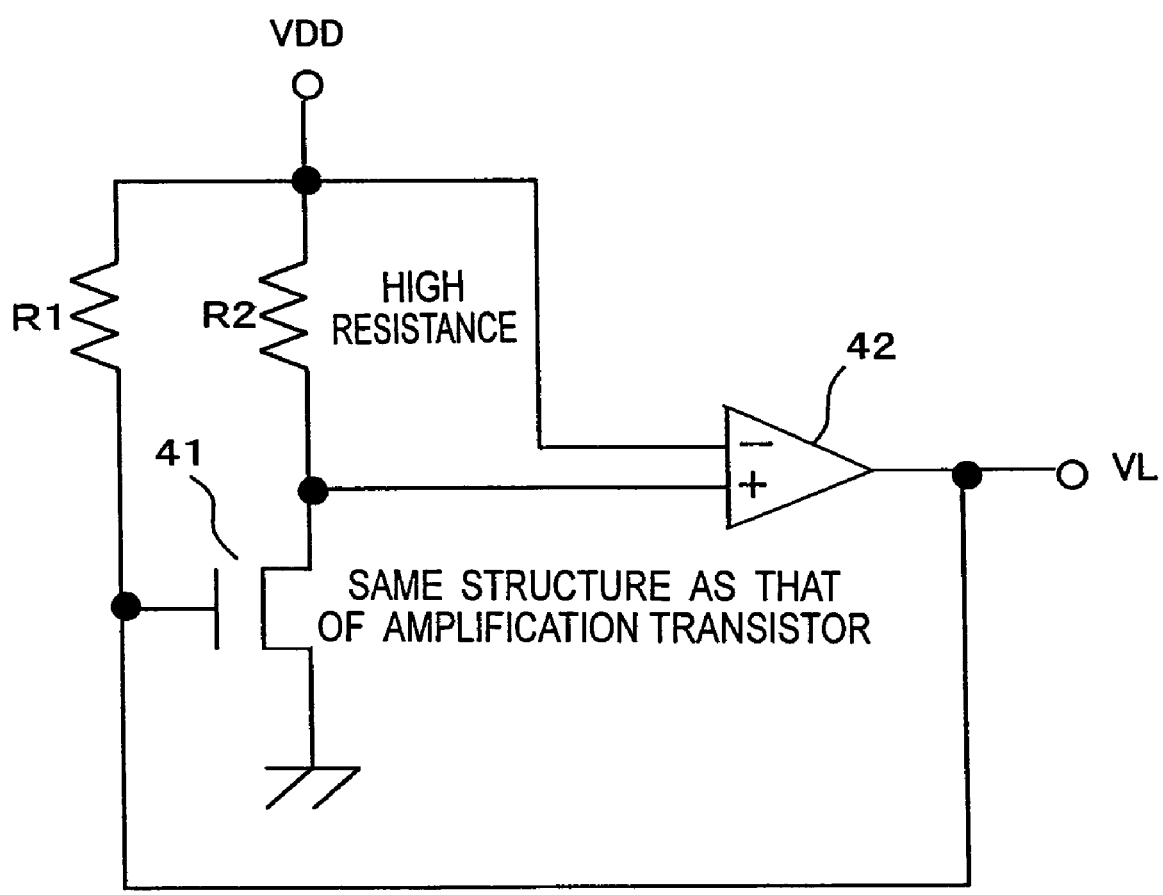
FIG. 11 is a circuit diagram of a VL voltage generation circuit of the two-dimensional amplifying solid-state imaging device.

FIG. 11 shows a VL generation circuit that employs a transistor of the same structure as that of the amplification transistor 3. As shown in FIG. 11, the VL generation circuit includes an NMOS transistor 41 of which a source is connected to the ground GND, to which gate the power supply voltage VDD is applied via a resistor R1 and to which drain the power supply voltage VDD is applied via a resistor R2 (high resistance), and a differential amplifier 42 of which a non-inverted input terminal is connected to the drain of the NMOS transistor and to which inverted terminal the power supply voltage VDD is applied. The output terminal of the differential amplifier 42 and the gate of the NMOS transistor are connected together. The NMOS transistor has the same structure as that of the amplification transistor 3.

During the period T5, the path between the drain and the source of the amplification transistor 3 is turned off, and therefore, the potential of the vertical signal line 9 is the power supply voltage VDD.

If a difference signal between output signals of the period T2 and the period T4 on the vertical signal line 9 is taken by a CDS circuit, a differential amplifier circuit or a clamp circuit (not especially described in the present specification) in the subsequent stage, then an effective signal due to the charge generated by light incident on the pixel of the (n,1)-th row is read.

On the other hand, in the period during which the pixel (n,1) through the pixel (n,k) are not selected, the potentials at the terminals of the amplification transistor 3 of the n-th row are expressed as follows.
Source: Ground VDD
Gate: VL
Drain: Changing from the ground GND to the power supply voltage VDD (vertical signal line)

The amplification transistor is also consistently put in OFF state.

As a result, the select transistor, which has been needed in the conventional pixel structure, is also unnecessary, and it becomes possible to increase the occupation area of the photodiode in the unit pixel area. This allows a high-quality image to be obtained and allows the pixel size to be reduced. Moreover, the output signal does not depend on the capacitance CFD of the signal charge storage section 8. According to the present invention, it is evident that no reduction occurs in the charge voltage conversion rate η also in the third embodiment even if the pixels to be connected in the vertical direction are increased in number and the capacitance CFD is increased.

The two-dimensional amplifying solid-state imaging device of the construction has an effect similar to that of the two-dimensional amplifying solid-state imaging device of the first embodiment.

Moreover, by making the inverting amplifier inoperative by controlling the voltage of the input portion of the inverting amplifier by the vertical scanning circuit 25 in the period during which the switched capacitor amplifier section 20 does not execute the read of the signal charge, the transistor for selecting the read line becomes unnecessary, and the transistor count per pixel can be further reduced.

Moreover, the voltage at the other terminal of the boosting capacitor 7 can be controlled by the potential of the potential control line 24. By using the potential control line 24 for controlling the reset voltage of the input portion of the amplification transistor 3 via the reset transistor 5 concurrently for controlling the voltage at the other terminal of the boosting capacitor 7, wiring can be simplified.

Moreover, by outputting the voltage to be applied to the potential control line from the voltage generation circuit fabricated on the identical semiconductor substrate with a transistor of the same structure as that of the amplification transistor 3 of the inverting amplifier, a constant potential of the optimum value can consistently be generated without receiving the influences of the process variation, the temperature change, the power supply voltage fluctuation and so on.

Moreover, by using the light shielding pattern 27 constructed of the conductive material common to all the pixels as the ground terminal of the inverting amplifier, the ground terminals of all the inverting amplifiers can easily be provided without separately providing wiring.

The Fourth Embodiment

Figure 12:
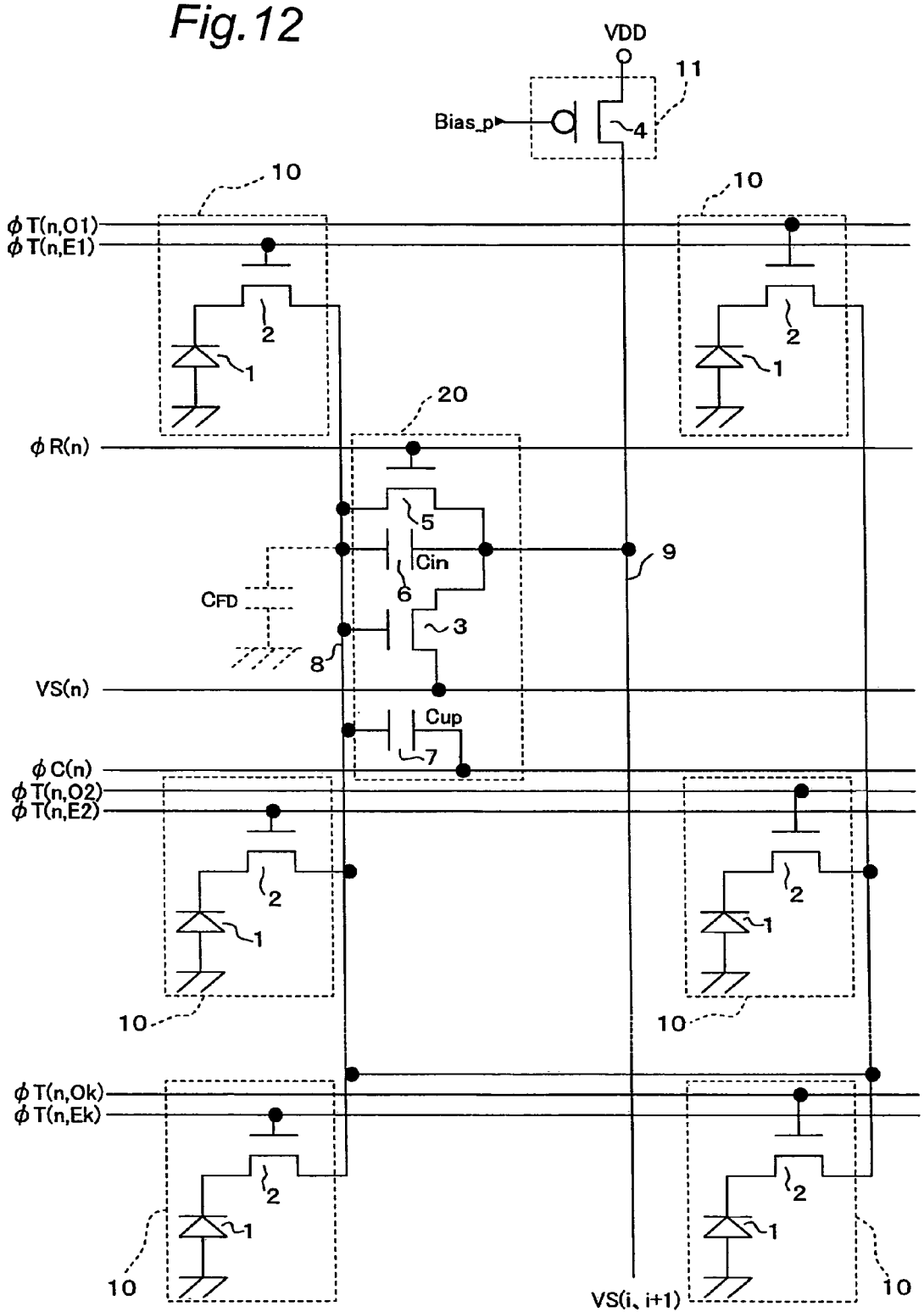
FIG. 12 is a circuit diagram showing the construction of a two-dimensional amplifying solid-state imaging device according to a fourth embodiment of the present invention.

FIG. 12 is a circuit diagram showing the construction of a two-dimensional amplifying solid-state imaging device as one example of an amplifying solid-state imaging device of the fourth embodiment of the present invention. In contrast to the first embodiment in which the signal charge storage section 8 is common to the vertical k photoelectric conversion transfer sections 10, the signal charge storage section 8 is common to 2 (horizontal)×k (vertical) photoelectric conversion transfer sections 10 in the fourth embodiment. As described above, the photoelectric conversion transfer sections may be provided by a combination of the horizontal direction with the vertical direction.

Figure 13:
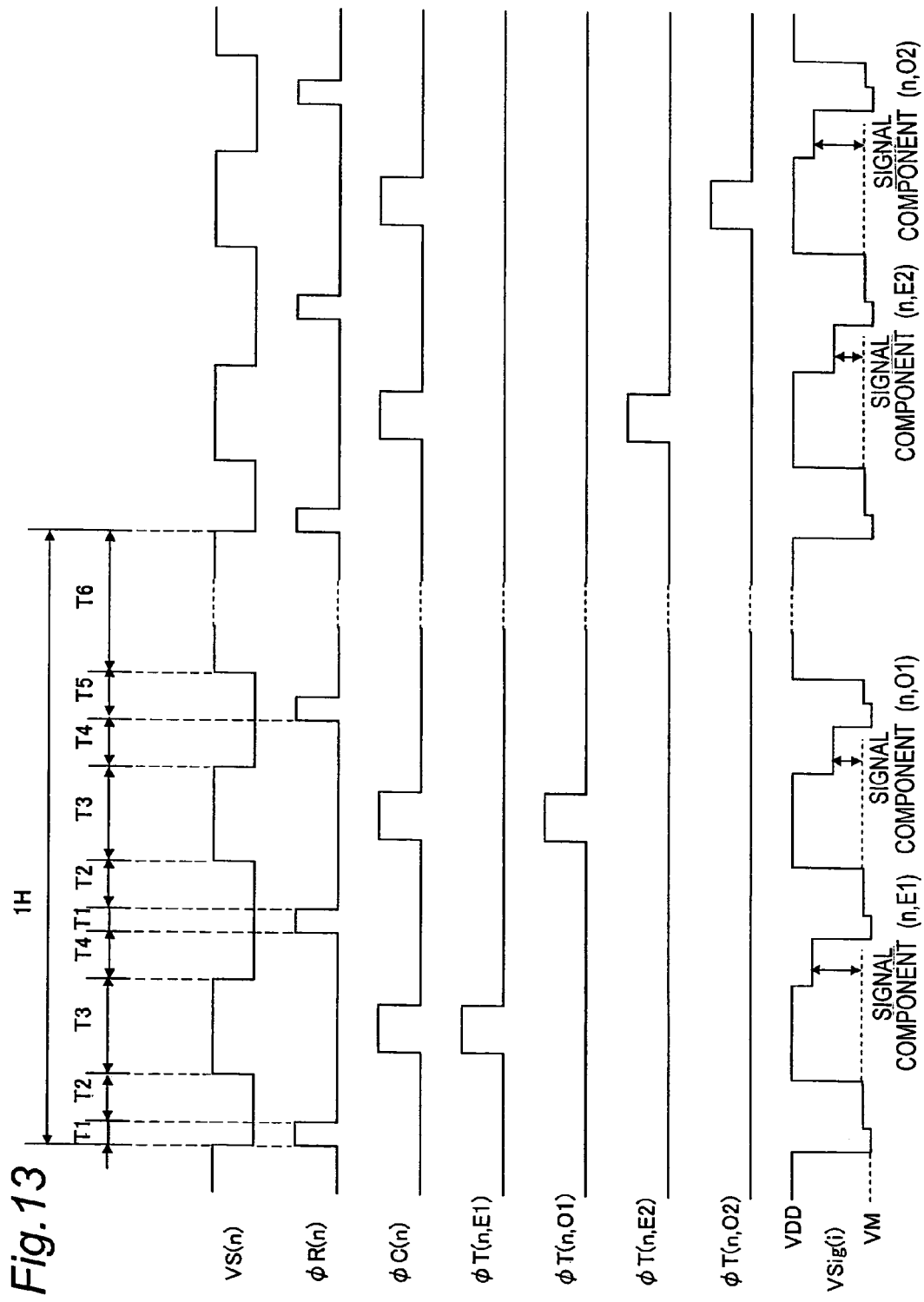
FIG. 13 is a timing chart of drive pulses of the two-dimensional amplifying solid-state imaging device.
Figure 14:
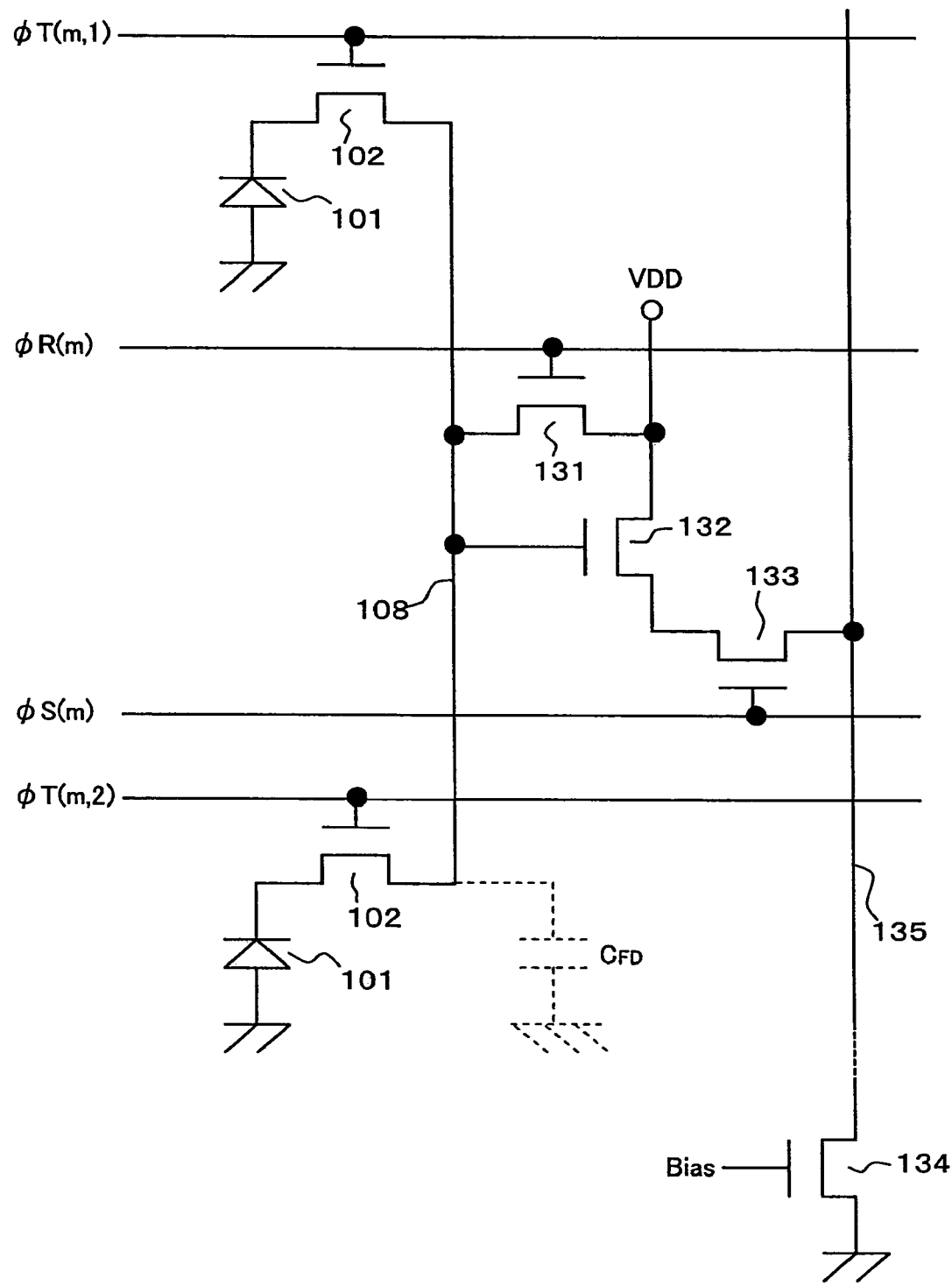
FIG. 14 is a circuit diagram showing the construction of a conventional amplifying solid-state imaging device.
Figure 15:
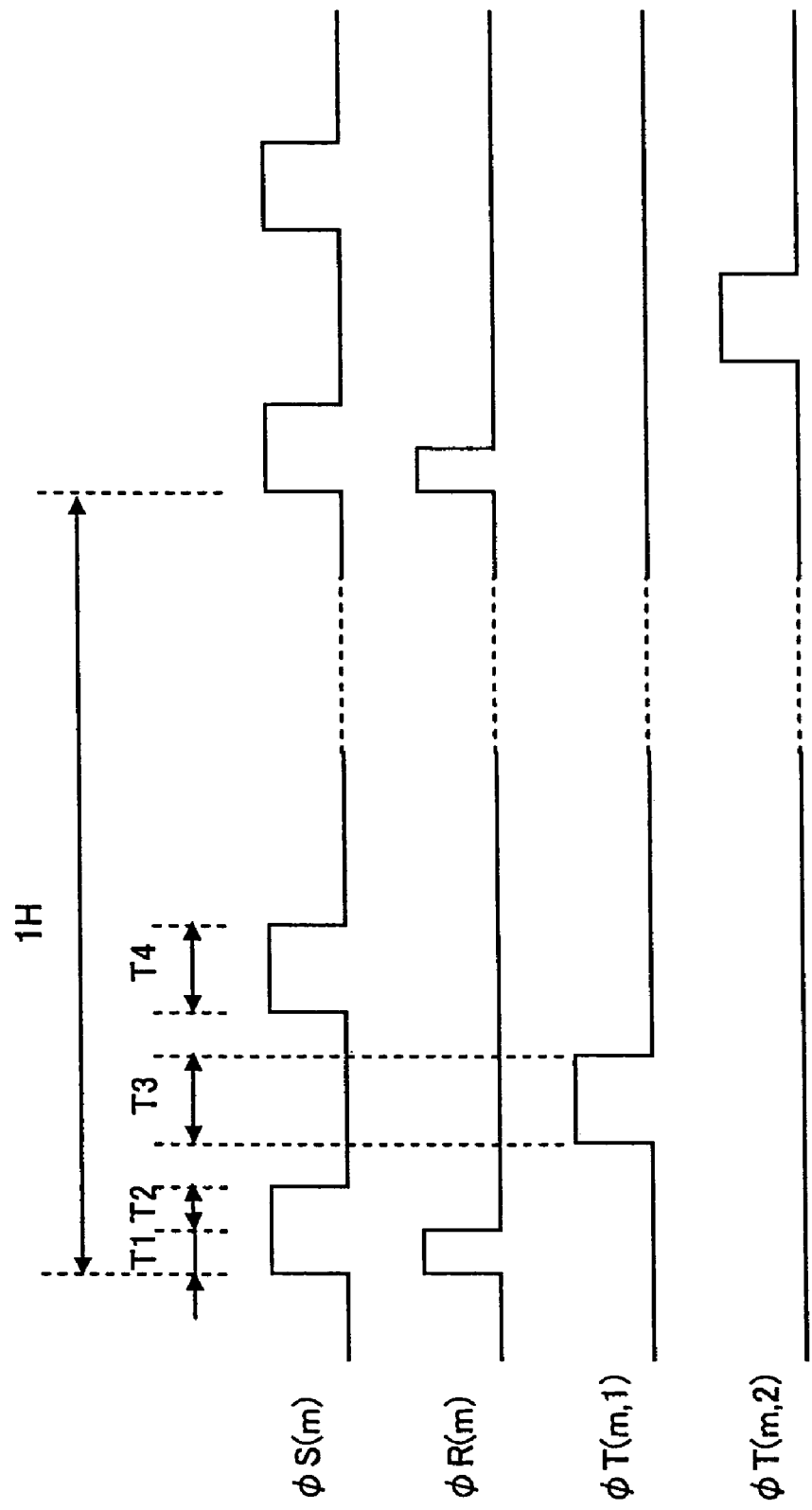
FIG. 15 is a timing chart of drive pulses of the amplifying solid-state imaging device.

In FIG. 12, the drive pulses applied to the gates of the transfer transistors 2 are separated into the photoelectric conversion transfer sections 10 of the odd number columns and the photoelectric conversion transfer sections 10 of the even number columns, so that the drive pulses are grouped into drive pulses $\phi T(n,O1)$, $\phi T(n,O2)$, ..., $\phi T(n,Ok)$ and drive pulses $\phi T(n,E1)$, $\phi T(n,E2)$, ..., $\phi T(n,Ek)$. With this arrangement, it is possible to execute read by distinguishing the photoelectric conversion transfer sections 10 on the same row connected to the common switched capacitor amplifier section 20. FIG. 13 shows the timing chart of the drive pulses of the two-dimensional amplifying solid-state imaging device of the fourth embodiment.

Although the first through fourth embodiments have been described on the basis of the two-dimensional amplifying solid-state imaging device, in which the pixels are two-dimensionally arranged, as one example of the amplifying solid-state imaging device, the present invention may be applied to an amplifying solid-state imaging device in which the pixels are linearly arranged.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An amplifying solid-state imaging device comprising:
    a plurality of photoelectric conversion transfer sections which are provided for individual pixels, respectively, and each of which has a photoelectric conversion element and a transfer transistor for transferring signal charge of the photoelectric conversion element, wherein
        the plurality of photoelectric conversion transfer sections are divided into a plurality of photoelectric conversion transfer section groups each composed of a predetermined number of the photoelectric conversion transfer sections, respectively;
    a plurality of switched capacitor amplifier sections each of which is provided for each of the photoelectric conversion transfer section groups and has an input side connected to output terminals of the transfer transistors in each of the photoelectric conversion transfer section groups and an output side connected to a signal line;
    a power supply side load connected to the output sides of the switched capacitor amplifier sections via the signal line; and
    a control section for controlling the transfer transistors and the switched capacitor amplifier sections, wherein
        each of the switched capacitor amplifier sections comprises a signal charge storage section to which the output sides of the transfer transistors of the photoelectric conversion transfer section group is connected, an amplification transistor that has an input side connected to the signal charge storage section and an output side connected to the signal line, a capacitance element connected between input and output of the amplification transistor and a reset transistor connected between the input and output of the amplification transistor, and wherein
        the capacitance element is connected in parallel with the reset transistor, and wherein
        the control section controls a potential at a ground terminal of an inverting amplifier comprised of the amplification transistor of the switched capacitor amplifier section and the power supply side load.

2. The amplifying solid-state imaging device as claimed in claim 1, wherein the photoelectric conversion element is a buried photodiode.

3. The amplifying solid-state imaging device as claimed in claim 1, wherein
    the control section controls the potential at the ground terminal of the inverting amplifier so that the inverting amplifier does not operate in a period during which the switched capacitor amplifier section does not execute signal charge read operation.

4. The amplifying solid-state imaging device as claimed in claim 1, wherein
    the switched capacitor amplifier section has a boosting capacitance element that has one terminal connected to the output terminal of each of the transfer transistors of the photoelectric conversion transfer section group, and wherein
    the control section controls a potential at the other terminal of the boosting capacitance element so that a potential on the output terminal of each of the transfer transistors of the photoelectric conversion transfer section group is deepened when a signal charge is transferred from the photoelectric conversion element to the signal charge storage section of the switched capacitor amplifier section via the transfer transistor.

5. The amplifying solid-state imaging device as claimed in claim 1, wherein
    the control section controls the potential at the ground terminal of the inverting amplifier so that the inverting amplifier does not operate when a signal charge is transferred from the photoelectric conversion element to the signal charge storage section of the switched capacitor amplifier section via the transfer transistor.

6. The amplifying solid-state imaging device as claimed in claim 1, wherein
    the power supply side load, which constitutes part of the inverting amplifier, is a constant current load transistor or a resistor.

* * * * *